United States Patent [19]

Minott

[11] 4,395,123

[45] Jul. 26, 1983

[54] INTERFEROMETRIC ANGLE MONITOR

[75] Inventor: Peter O. Minott, Bowie, Md.

[73] Assignee: The United States of America as represented by the Administrator of the National Aeronautics and Space Administration, Washington, D.C.

[21] Appl. No.: 195,227

[22] Filed: Oct. 8, 1980

[51] Int. Cl.³ .............................................. G01B 9/02
[52] U.S. Cl. ..................................... 356/353; 356/363
[58] Field of Search ...................... 356/28.5, 353, 363; 250/231 SE

[56] References Cited

U.S. PATENT DOCUMENTS

| | | | |
|---|---|---|---|
| 3,433,568 | 3/1969 | Skalski et al. | 356/106 |
| 3,484,169 | 12/1969 | Skalski et al. | 356/106 |
| 3,512,890 | 5/1970 | McLaughlin | 356/106 |
| 3,764,216 | 10/1973 | Bliek et al. | 356/106 |
| 3,982,835 | 9/1974 | Schwomma | 356/106 |
| 4,138,196 | 2/1979 | Redman | 356/106 |
| 4,183,670 | 1/1980 | Russell | 356/106 |

OTHER PUBLICATIONS

De Cou, "Spacecraft Attitude Measurement Using Spatial Coherence of Laser or Star Light", *IEEE Trans. on Aerosp. and Elec. Sys.*, vol. AES7, No. 2, pp. 288–298, 3/71.

De Cou, "Interferometric Star Tracking", *Applied Optics*, vol. 13, No. 2, pp. 414–424, 2/74.

*Primary Examiner*—John K. Corbin
*Assistant Examiner*—Matthew W. Koren
*Attorney, Agent, or Firm*—John O. Tresansky; John R. Manning; Ronald F. Sandler

[57] ABSTRACT

Two mutually coherent light beams (50, 58) formed, for example, from a single monochromatic light source (32) are directed to a reflecting surface (20) of a rotatable object (18), such as a mirror, where they are reflected into imaging optical lens (10) having a focal plane optically at infinity whereby a series of interference fringes (14) will be formed in the focal plane (12) which will translate linearly thereacross in response to angular rotation of the object. Photodetectors (22, 24) are located adjacent the focal plane to detect the fringe translation and outputs a signal in response thereto which is fed to a signal processor (30) which is adapted to count the number of fringes detected and develop therefrom a measure of the angular rotation and direction of the object.

11 Claims, 5 Drawing Figures

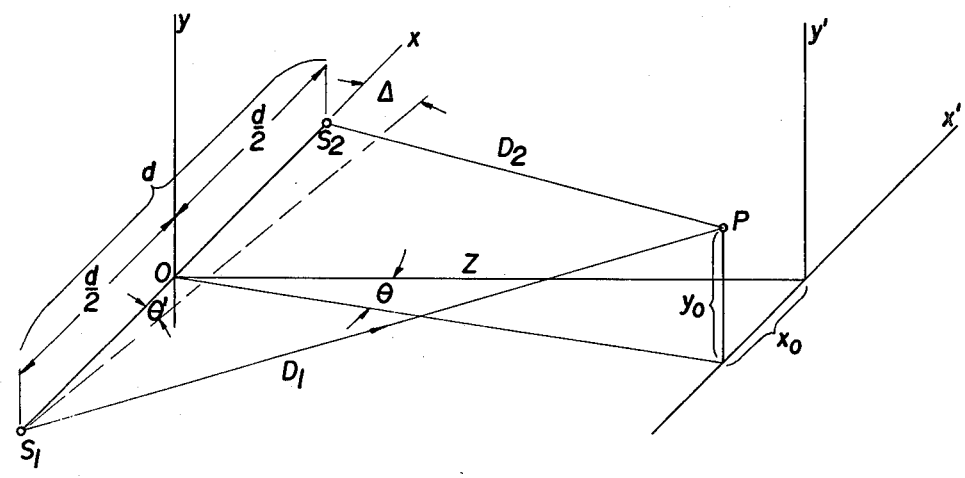
FIG. 1
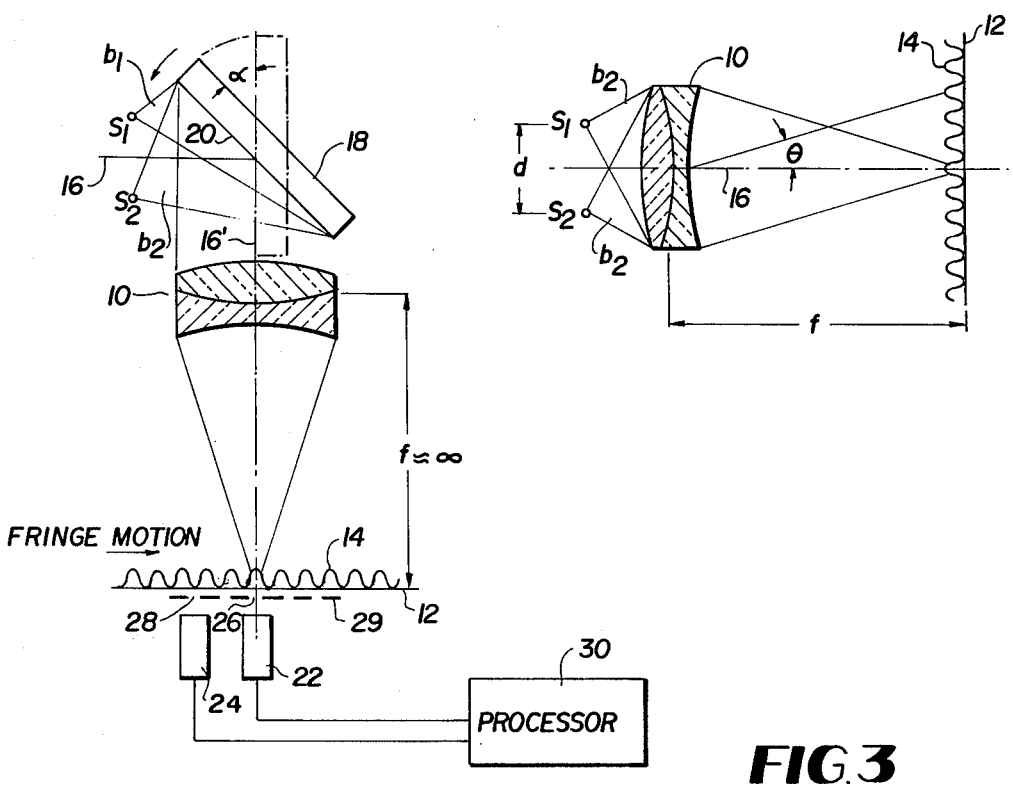
FIG. 2
FIG. 3

INTERFEROMETRIC ANGLE MONITOR

ORIGIN OF THE INVENTION

The invention described herein was made by an employee of the U.S. Government and may be manufactured and used by or for the Government for governmental purposes wthout the payment of any royalties thereon or therefor.

TECHNICAL FIELD

The invention relates to motion sensing apparatus and more particularly to apparatus for monitoring the angular position of a rotating object.

BACKGROUND ART

The invention has particular utility in providing a relatively simple means which can be used for measuring the scan profile of a rotating mirror and is adapted to provide a precise measurement of position versus time without mechanically affecting the performance of the mirror. Accordingly, the invention has widespread application wherever it is desired to determine angular velocity or angular displacement of a moving object without affecting the motion of the object and without having the measurement influenced by linear displacements of the object.

In the past, measurement of the rotation of an object, such as a mirror, was made by placing a precisely divided graticule in the focal plane of a lens. A collimator beam was then reflected off the rotating mirror and the position of the reflected beam in the lens focal plane with respect to the graticule was read to determine the rotation angle. The disadvantage of this method is that the distortions in the lens must not only be known, but the lens itself must have a relatively wide stigmatic field and the graticule must be relatively large and precisely measured.

STATEMENT OF THE INVENTION

Accordingly, it is an object of the present invention to provide apparatus for improving the precision by which angular displacement of a rotating object can be measured.

Another object of the present invention is to provide apparatus for providing a precise measurement of the angular displacement of a rotating mirror without the imposition of any loading effects on the mirror.

Yet another object of the present invention is to provide apparatus for monitoring the angular position of a rotating mirror which obviates the need for a precision graticule as required in known prior art apparatus.

Still another object of the present invention is to provide angle encoding with relatively little input information.

These and other objects are achieved by an apparatus which utilizes a series of Young's interference fringes to measure the angular displacement of a rotatable object. Briefly, the system comprises a pair of monochromatic, mutually coherent light beam sources and an imaging optical lens placed relative to a reflecting surface on the object whose rotation is to be measured. Light from the two beams is directed to the reflecting surface where it is then reflected onto the imaging optical lens which has a focal plane substantially at infinity, whereupon a series of interferometric fringes are formed thereat. Photodetectors located adjacent the focal plane are adapted to sense the fringes passing a predetermined point inasmuch as the fringe pattern will move across the focal plane as a result of rotational motion of the object. Additionally, a signal processor is included for providing a measure of the angular motion in response to the number of fringes detected.

The foregoing as well as other objects, features and advantages of the present invention will become more apparent from the following detailed description taken in conjunction with the appended drawings.

BRIEF DESCRIPTION OF THE DRAWINGS

FIG. 1 is a geometrical illustration of the manner in which Young's interference fringes are generated;

FIG. 2 is a schematic representation of the basic principle of the invention for generating an interference fringe pattern;

FIG. 3 is a schematic diagram broadly illustrative of the preferred embodiment of the subject invention;

DETAILED DESCRIPTION OF THE INVENTION

Figure 4:
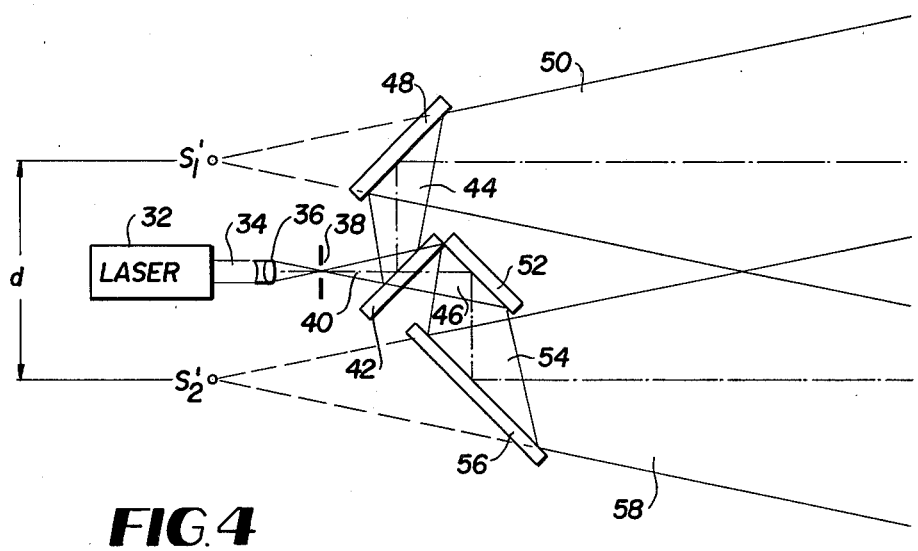
FIG. 4 is a schematic representation of one configuration for generating a pair of virtual point sources of radiation from a common monochromatic light source.

Referring now to the drawings and first to FIG. 1, $S_1$ and $S_2$ denote two monochromatic coherent point sources of radiation located along the x axis of an x-y plane being equidistantly spaced apart from the origin by a distance $d/2$. As is well known from Young's experiment disclosed, for example, in a publication entitled "Fundamentals of Optics", Jenkins and White, 3rd Edition, McGraw-Hill, 1957, pages 234–241, an interference fringe pattern will be generated in a parallel $x'$-$y'$ plane separated a distance Z from the x-y plane where Z is extremely large in relation to d. Where Z approaches infinity, the path difference $\Delta$ between the paths $D_1$ and $D_2$ to the point $p(x_0, y_0)$ can be expressed as:

$$\Delta = d \sin \theta' = d \sin \theta \tag{1}$$

since the angle $\theta$ and $\theta$ are very small and practically equal. This relationship is well known and is illustrated in the above-referenced Jenkins, et al. publication.

As to the intensity profile of the fringe pattern observed in the $x',y'$ plane, if one defines the amplitude at point P contributed by one of the sources $S_1$ or $S_2$ as a and assumes that they are of equal intensity and have a wavelength $\lambda$, then the intensity profile I, seen along the $x'$ axis of FIG. 1, can be stated as:

$$I = 4a^2 \cos^2\left[\frac{2\pi\Delta}{\lambda}\right] = 2a^2\left[1 + \cos\left(\frac{4\pi\Delta}{\lambda}\right)\right] \tag{2}$$

$$= 2a^2\left[1 + \cos\left(\frac{4\pi d \sin\theta}{\lambda}\right)\right]$$

For small angles, $\theta = \sin \theta$ and accordingly a set of equally spaced fringes are provided having an angular period of $2\lambda/d$.

Referring now to FIG. 2, if the two point sources $S_1$ and $S_2$ providing beams $b_1$ and $b_2$, respectively, are placed in front of an imaging optical system 10 suitable for provide a focal plane 12 which is optically at infinity, a series of fringes 14 having the following intensity distribution I will be formed in the focal plane 12:

$$I = I_0[1 + \cos(4\pi f d \sin\theta/\lambda)] \quad (3)$$

where $I_0$ is intensity of the axis 16 formed by the perpendicular bisector between the two point sources $S_1$ and $S_2$ and the angle $\theta$ measured from the axis 16.

Considering now the embodiment shown in FIG. 3, an object 18, e.g. a mirror, having an optical flat reflecting surface 20 is shown placed between the two point sources $S_1$ and $S_2$ and the lens system 10 and rotated counterclockwise about its center point. The axis 16 formed by the perpendicular bisector of the sources $S_1$ and $S_2$ will be reflected as the axis 16' and will appear to rotate when viewed from the lens side of the reflecting surface 20. Accordingly, by virtue of the focusing effect of the imaging system 10, a fringe pattern 14 which appears to be at infinity will be formed in the focal plane 12 and will move across the focal plane depending upon the direction of rotation of the object 18. If, for example, the object 18 is rotated at angle $\alpha$, the reflected axis 16' will have an apparent rotation of $2\alpha$ and the fringe pattern will move to the right, as shown. The intensity of the fringe pattern appearing in the focal plane 12 will also be proportional to the angle $\alpha$ according to the following expression:

$$I \approx 1 + \cos[4\pi d \sin(2\alpha)/\lambda] \quad (4)$$

This relation between I and $2\alpha$ forms the basis of the subject invention in that by counting the number of fringes passing a predetermined location of the focal plane 12, a determination of the angular movement of the reflecting face 20 of the rotating object 18 can be made.

Accordingly, at least one but preferably a pair of photodetectors 22 and 24 are located behind respective apertures 26 and 28 which are in the form of slits provided in a mask element 29 placed behind the focal plane 12. The fringe count is related to mirror rotation by the expression:

$$\alpha = \tfrac{1}{2}\sin^{-1}[2N\lambda/d] \quad (5)$$

where N is the fringe count. Since wavelength $\lambda$ and separation d can be and are made constant values by a predetermined selection of the system parameters, a signal processor 30 is coupled to photodetectors 22 and 24 which is programmed to take the fringe detection output from photodetector 22, for example, count the number of fringes and make the appropriate calculation for $\alpha$ as mentioned above with reference to equation (5). The second photodetector 24 is utilized to provide an indication of the direction of rotation by providing for a means whereby phase of the fringes may be measured in the signal processor 30.

As noted above, the point sources $S_1$ and $S_2$ are provided by monochromatic point sources. Additionally, the sources must be mutually coherent for the generation of the fringe pattern. In a preferred implementation, a helium-neon laser is used to form the two point sources, $S_1$ and $S_2$ as will be disclosed hereinafter. The sources are typically spaced 6.328 mm apart. Light having a wavelength of 6328 Å ($0.6328 \times 10^{-6}$ meters) is emitted which provides a fringe pattern spacing of 100 microradians along the axis 16 of FIG. 2 and 16' of FIG. 3 which increases monotonically to 100.2713 microradians at 7.5° off axis which corresponds to a rotation of the mirror face 20 of the body 18 of 3.75°. Accordingly, an angular rotation of the mirror body 18 of 3.75° will cause a fringe count of 1305 and thus the mirror position will be known precisely for 1305 counts along the focal plane 12. Higher accuracies are obtainable by larger source separations. For example, a spacing of 63.28 mm. would provide a 10 microradian fringe spacing which may be read to better than 1 microradian. However, the limit of accuracy is determined by the mechanical, thermal and optical sources of noise.

Figure 5:
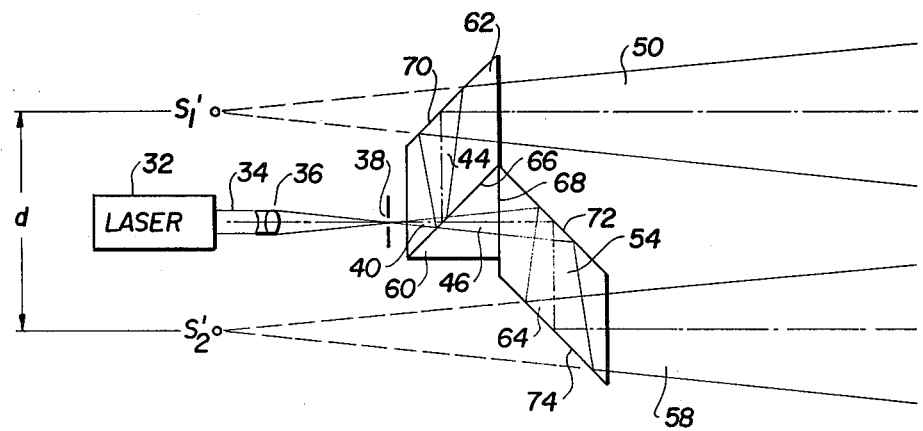
FIG. 5 is a schematic representation of an alternative configuration for generating a pair of virtual point sources from a common source.

Referring now to FIGS. 4 and 5, there are shown two configurations for developing two virtual sources $S_1'$ and $S_2'$, corresponding to $S_1$ and $S_2$, from a single laser source 32 provided by a helium-neon laser operating in the $TEM_{00}$ mode. Produced thereby is a 6328 Å beam 34 having a diameter of 1 mm. and having a divergence of approximately 1 milliradian. The output beam 34 is directed to a beam expanding objective lens configuration 36 and then projected through a pinhole 38 placed at the focus of the lens, whereupon a divergent spatially filtered spherical beam 40 is provided. Where, for example the lens 36 has a 3.9 mm. focal length and the pinhole 38 has a diameter of 6.8 μm diameter, a 3.9 μm diameter image is formed at the focal plane, which after passing through the pinhole 38, a 15° divergent beam 40 is obtained.

FIG. 4 illustrates the manner in which the virtual sources $S_1'$ and $S_2'$ are developed by means of a mirror configuration while the implementation shown in FIG. 5 illustrates a prism arrangement which is suitable for provide the same function. In FIG. 4 the beam 40 is projected onto a beam splitter 42 which may have, for example, a partially reflective mirror. As such, a portion of the beam 40 is reflected as beam 44 while the remainder of the beam is passed therethrough as beam 46. The reflected beam 44 is then projected onto a mirror 48 which reflects an output beam 50 having a virtual source $S_1'$. The beam 46, on the other hand, is reflected off a second mirror 52 as a beam 54, where it is projected onto a third mirror 56 which reflects an output beam 58 having a virtual source of $S_2'$. By directing the output beams 50 and 58 onto the reflecting surface 20 as shown in FIG. 3, the angular rotation of the mirror object 18 can be sensed and measured by means of the photodetectors 22 and 24 in conjunction with the processor 30.

Insofar as the embodiment shown in FIG. 5 is concerned, the beam splitter mirror arrangement is replaced by a right angled prism 60 which provides the beam splitter function and two rhomboid prisms 62 and 64 which are attached to adjoining faces 66 and 68 of the right angle prism 60. As shown, the partially reflected beam 44 is reflected off the rhomboid face 70 to provide the output beam 50 while the partially past beam 46 is reflected off of the two rhomboid faces 72 and 74 the rhomboid prism 64 to provide the output beam 58. Because three prisms 60, 62 and 64 are bonded together, this configuration is inherently much more stable than the mirror configuration shown in FIG. 4.

What is significant about the invention is that the angle encoding apparatus disclosed herein requires the knowledge only of the separation, d, of the sources and the wavelength $\lambda$ of the source. Focal length of the lens configuration 36 is not a factor in the measurement and thus narrow field of view lenses can be used because the fringe detector, i.e. the photodetector 22 shown in FIG. 3, is required only on axis, that is along the axis 16' shown in FIG. 3. Further, if the separation of sources changes it affects the separation of all the fringes equally, so that if the purpose of measuring rotation of the mirror is to measure the constancy of rotation velocity, the measurement is not affected by slow changes in source separation. Further, frequency of the output from photodetectors 22 and 24 is a direct measurement of the angular velocity of the rotating member 18 so that differencing and timing devices are not required for velocity measurement.

Thus what has been shown and described is a relatively simple yet precise means of determining angular velocity or angular displacement of a moving object without affecting the motion of the object and without having the measurement influenced by linear displacements of the object. While two embodiments are disclosed for generating two spatially separated coherent sources of light for operation and connection with the subject invention, other means may be utilized when desired such as arrangements including a Lloyd mirror, Fresnel double mirror, Fresnel double prism and Billet split lens configurations.

Having thus shown and described what is at present considered to be the preferred embodiment of the subject invention, modifications will readily occur to those skilled in the art. Accordingly, all modifications, changes and alterations coming within the spirit and scope of the present invention as defined in the appended claims are herein meant to be included.

I claim:

1. Apparatus for measuring the angular displacement of a rotatable object having means for reflecting optical beams, by measuring the linear displacement of a series of optical interference fringes, comprising:
    means for providing from sources ($S_1$, $S_2$) separated by a distance (d) coherent radiation in the form of two mutually coherent, generally parallel optical beams ($b_1$, $b_2$) directed toward said reflecting means (20) of said rotatable object;
    imaging optical means (10) positioned to receive said two optical beams from said reflecting means (20), for providing a focal plane (12) optically at a distance (Z) from said reflecting means of a relatively larger magnitude in relation to the distance (d) separating said sources whereby an interference fringe pattern (14) is formed at said focal plane (12) which translates linearly thereacross in response to angular movement of said reflective means;
    detector means (22) located at a predetermined point along said focal plane and being operable to provide an output signal indicative of translation of said fringe pattern; and
    means (30) responsive to said output signal for providing a measure of said angular movement of said reflective means.

2. The apparatus as defined by claim 1 wherein said means for providing said coherent radiation comprises at least one monochromatic light source (32).

3. The apparatus as defined by claim 1 wherein said means for providing said coherent radiation comprises a monochromatic light source (32) and optical means (42, 48, 52, 56) associated with said monochromatic light source which form said two optical beams from said source so that they appear to emanate from a pair of virtual sources ($S_1'$, $S_2'$).

4. The apparatus as defined by claim 3 wherein said monochromatic light source (32) comprises a laser.

5. The apparatus as defined in claim 1 wherein said imaging means (10) provides a focal plane (f) which is optically at infinity.

6. The apparatus as defined by claim 1 wherein said detector means comprises photodetector means (22) providing an output signal indicative of the number of fringes in said pattern passing said predetermined point.

7. The apparatus as defined by claim 6 and wherein said means for providing said measure of angular movement comprises processor means (30) programmed to implement a predetermined mathematical function which relates the number of fringes indicated in said output signal to angular movement.

8. The apparatus as defined by claim 7 wherein said processor means implements the mathematical expression:

$$\alpha = \tfrac{1}{2} \sin^{-1} [2N\lambda/d]$$

where $\alpha$ is the angular movement of said reflective means, N is the number of fringes, $\lambda$ is the wavelength of the coherent radiation, and d is the separation distance between said sources.

9. The apparatus as defined by claim 6 wherein said detector means includes additional photodetector means (24) for providing an output signal which is usable to provide an indication of the direction of translation of said fringe pattern.

10. The apparatus as defined by claim 6 and additionally including aperture means (29) located intermediate said photodetector means (22, 24) and said focal plane (12).

11. Apparatus for measuring the angular displacement of a rotatable object having means for reflecting optical beams, by measuring the linear displacement of a series of optical interference fringes, comprising:
    a source (32) emitting monochromatic, coherent radiation (34);
    beam expanding optics (36) disposed relative to said source to focus said radiation;
    a first aperture (38) positioned at the focus of said beam expanding optics to pass said radiation as a single diverging spherical beam (40);
    means including a plurality of reflective surfaces (42, 48, 52, 56/60, 62, 68, 74) for dividing said single spherical beam and projecting toward said reflective means (20) a pair of generally parallel, diverging spherical beams ($b_1$, $b_2$) emanating from a pair of virtual sources ($S_1$, $S_2$) separated by a distance (d);
    an imaging optical system (10) having an optical axis intersecting said object, positioned to focus radiation from said pair of diverging spherical beams reflected from said reflective means upon a focal plane (12) optically at a distance (Z) from said reflecting means of a significantly larger magnitude in relation to said distance (d) separating said virtual sources whereby an interference fringe pattern (14) is formed at said focal plane, and wherein said pattern translates linearly across said focal plane in response to angular movement of said reflective means;
    a second aperture (26) positioned behind said focal plane and centered upon said optical axis of said imaging system; and
    a photodetector exposed to said radiation via said second aperture for providing a signal indicative of the intensity of said fringe pattern at said second aperture.

* * * * *